United States Patent [19]
Matsumoto et al.

[11] Patent Number: 5,771,322
[45] Date of Patent: Jun. 23, 1998

[54] LIGHT-RECEIVING STRUCTURE FOR WAVE-GUIDE TYPE OPTICAL DEVICES

[75] Inventors: Kiyoto Matsumoto; Yasuhisa Tanisawa, both of Tokyo, Japan

[73] Assignee: NEC Corporation, Tokyo, Japan

[21] Appl. No.: 803,068

[22] Filed: Feb. 20, 1997

Related U.S. Application Data

[63] Continuation of Ser. No. 361,560, Dec. 22, 1994, abandoned.

[30] Foreign Application Priority Data

Dec. 27, 1993 [JP] Japan .................................. 5-329290

[51] Int. Cl.$^6$ ................................................. G02B 6/42
[52] U.S. Cl. ................................ 385/31; 385/33; 385/49; 385/94
[58] Field of Search ................................ 385/31, 32, 33, 385/35, 39, 47, 49, 88, 89, 92, 93, 94

[56] References Cited

U.S. PATENT DOCUMENTS

| | | | |
|---|---|---|---|
| 4,611,884 | 9/1986 | Roberts | 385/47 X |
| 4,901,329 | 2/1990 | Leas | 385/14 X |
| 4,902,093 | 2/1990 | Bowen | 385/31 |
| 4,945,400 | 7/1990 | Blonder et al. | 385/15 X |
| 5,073,003 | 12/1991 | Clark | 385/33 |
| 5,291,572 | 3/1994 | Blonder et al. | 385/94 |
| 5,357,103 | 10/1994 | Sasaki | 385/31 X |
| 5,384,872 | 1/1995 | Jacobs-Cook et al. | 385/31 |
| 5,384,873 | 1/1995 | Chun et al. | 385/31 |
| 5,390,271 | 2/1995 | Priest | 385/31 X |

FOREIGN PATENT DOCUMENTS

| | | |
|---|---|---|
| 0192850A1 | 9/1986 | European Pat. Off. . |
| 0473339A1 | 3/1992 | European Pat. Off. . |
| 0555968A1 | 8/1993 | European Pat. Off. . |
| 3731311A1 | 3/1989 | Germany . |
| 1183605 | 7/1989 | Japan . |
| 336508 | 2/1991 | Japan . |

*Primary Examiner*—Rodney B. Boverick
*Assistant Examiner*—Hemang Sanghavi
*Attorney, Agent, or Firm*—Whitham, Curtis, Whitham & McGinn

[57] ABSTRACT

A light receiving structure for waveguide type optical devices, which excels in productivity, is compactly formed and permits highly efficient coupling, is provided. A recess is provided in part of the surface of a substrate on which an optical waveguide is formed, and a light-receiving element is mounted on the recess, with its light-receiving face upward. Near the recess is formed an end face of the optical waveguide in advance, so that a light be emitted therefrom. On the other hand, over the substrate is arranged a cover in which a groove is formed in a position opposite to the optical waveguide and a reflector is formed in a position opposite to the light-receiving element. The light emitted from the optical waveguide is reflected by the reflector and coupled to the light receiving element. A through hole can be bored in the substrate in advance, so that the packaging density can be improved by mounting the light-receiving element with its light-receiving face toward the through hole and thereby mounting the light-receiving element on the under side.

13 Claims, 6 Drawing Sheets

LIGHT-RECEIVING STRUCTURE FOR WAVE-GUIDE TYPE OPTICAL DEVICES

This is a Continuation of application No. 08/361,560 filed Dec. 22, 1994, now abandoned.

BACKGROUND OF THE INVENTION

The present invention relates to a light-receiving structure for waveguide type optical devices, and more particularly to a light-receiving structure for waveguide type optical devices applicable to optical fiber communication.

Waveguide type optical devices are suitable for the integration of such functions as light branching and coupling and optical demultiplexing and multiplexing. They also permit mass-production in a batch process. For these reasons, great hope is pinned on their application to optical transmitter/receiver modules for use in subscriber optical communication systems. Such optical transmitter/receiver modules usually have built-in light receiving elements together with elements for transmitting use, such as semiconductor laser elements. These transmitting and receiving elements are arranged on a substrate. Therefore, it is necessary to efficiently couple the light emitted from the optical waveguide to the light receiving element.

Light-receiving structures for waveguide type optical devices according to the prior art include what is disclosed in the Japanese Patent Laid-open No. 036508 of 1991 (Reference 1). However, the light-receiving structure described in Reference 1, as its groove is formed with a dicing saw, is subject to serious damage on the optical waveguide. It does not allow its end face to be mirror-ground, resulting in the problem that the propagating light suffers heavy loss. There is involved another problem that, because a 45-degree inclination is needed, the productivity of groove formation is poor.

Another example of the prior art is the light-receiving structure disclosed in the Japanese Patent Laid-open No. 183605 of 1989 (Reference 2). In this structure, a light-receiving element is mounted, with the light-receiving face upward, on a circuit substrate provided in parallel to an optical fiber. The end face of the optical fiber adheres tightly to one of the end faces of the optical waveguide substrate while the other end face of the optical waveguide is inclined. A lens is glued to the under face of the optical waveguide opposite to this inclined end face. The signal light having travelled over the optical fiber comes incident on the optical waveguide and, after being reflected by the inclined end face, is coupled by the lens to the light-receiving element. The light-receiving structure described in Reference 2 has the disadvantage that, because it consists of many constituent elements, it cannot be built compactly, and is inconvenient and costly to manufacture.

SUMMARY OF THE INVENTION

An object of the present invention is to realize a light-receiving structure for waveguide type optical devices, excelling in productivity, compactly formed and permitting highly efficient coupling.

In a light-receiving structure for waveguide type optical devices according to one aspect of the present invention there is a waveguide substrate on which an optical waveguide is formed and a light-receiving element to be optically coupled to a light incident from the optical waveguide. The light-receiving element is mounted, with its light receiving face upward, on the bottom face of a recess which is lower than the surface of the waveguide substrate. The optical waveguide has an end face near the light-receiving element, and the light emitted from the end face is reflected by a reflector arranged on the light-receiving element and thereby coupled to the light receiving element.

According to another aspect of the invention, in a light-receiving structure for waveguide type optical devices there is a waveguide substrate on which an optical waveguide is formed and a light-receiving element to be optically coupled to a light incident from the optical waveguide. The optical waveguide has a through hole on the light path on which the optical waveguide is formed, and the light-receiving element is mounted, with its light-receiving face directed toward the through hole, on the face opposite to that on which the optical waveguide of the waveguide substrate is formed. The optical waveguide has an end face near the through hole, and the light emitted from the end face is reflected by a reflector arranged on the light-receiving element and thereby coupled to the light receiving element.

BRIEF DESCRIPTION OF THE DRAWINGS

The above-mentioned and other objects, features and advantages of the present invention will become more apparent from the following detailed description when taken in conjunction with the accompanying drawings, wherein.

DETAILED DESCRIPTION OF THE PREFERRED EMBODIMENTS

Figure 1:
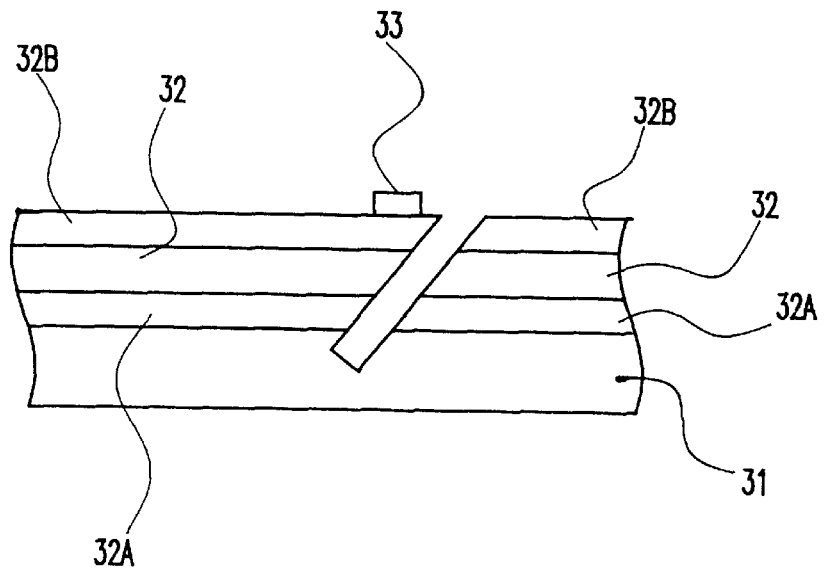
FIG. 1 shows a cross-sectional view of a light-receiving device according to the prior art.

To facilitate the understanding of the present invention, the configuration of a light-receiving structure for waveguide type optical devices according to the prior art will be described first. FIG. 1 shows a cross-sectional view of a light-receiving device described in the aforementioned Reference 1. A silicon dioxide waveguide 32 cladded with silicon dioxide layers 32a and 32b is formed on a silicon substrate 31, and a light-receiving element 33 is mounted on it. A groove is formed, for instance with a dicing saw, from the upper face of the silicon substrate 31 so that the cut face form an inclination of 45 degrees against the propagating light axis of an optical waveguide 2. A signal light having travelled over the optical waveguide 32 is reflected upward by the end face of the groove, and becomes incident on the light-receiving element 33 to be coupled to it. Such a structure, as stated hereinabove, requires the formation of a groove in the substrate, is subject to serious damage on the optical waveguide and permits no satisfactory coupling. Furthermore, the reflective face, which is flat, cannot condense light and, accordingly, is incapable of highly efficient coupling.

Next will be described the present invention in detail with reference to a drawing.

Figure 2:
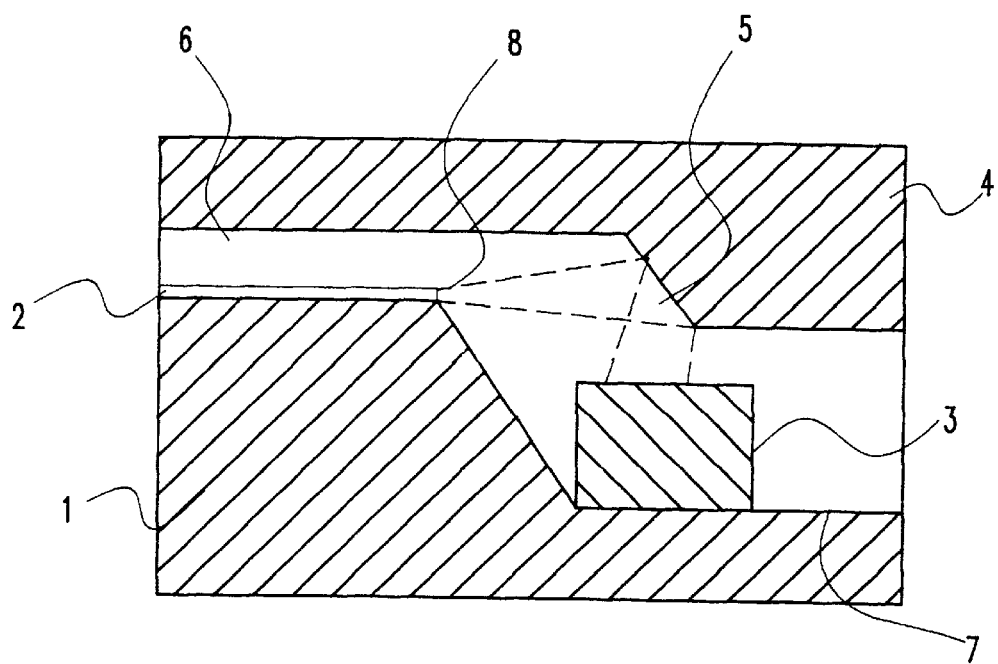
FIG. 2 shows a cross-sectional view of a light-receiving structure for waveguide type optical devices, which is a first preferred embodiment of the invention.

FIG. 2 shows a cross-sectional view of a light-receiving structure for waveguide type optical devices, which is a first preferred embodiment of the invention. An optical waveguide 2 is formed on a first silicon substrate 1. Part of the first silicon substrate 1 has a recess 7 which is slightly lower than the surface of the first silicon substrate 1, and a light-receiving element 3 is mounted on the recess 7 with its light-receiving face upward. A PIN photo-diode chip or an avalanche photo-diode chip is used as the light receiving element 3. On the other hand, the optical waveguide 2 has an end face 8 formed near the recess 7.

Further over the first silicon substrate 1 is formed a second silicon substrate 4, which is provided with a groove 6 in the position opposite to the optical waveguide 2 and a reflector 5 in the position opposite to the light-receiving face of the light-receiving element 3.

A signal light input incident on the optical waveguide 2 from an outside source, such as a transmission path optical fiber. After the incident signal light passes functional elements (not shown) for optical branching, optical demultiplexing and the like, all formed on the substrate 1, a light is emitted from the end face 8. The emitted light first expands, is reflected by the reflector 5 of the second silicon substrate 4, and received by the light receiving face of the light-receiving element 3.

Next will be described a second preferred embodiment of the present invention with reference to FIG. 3.

Figure 3:
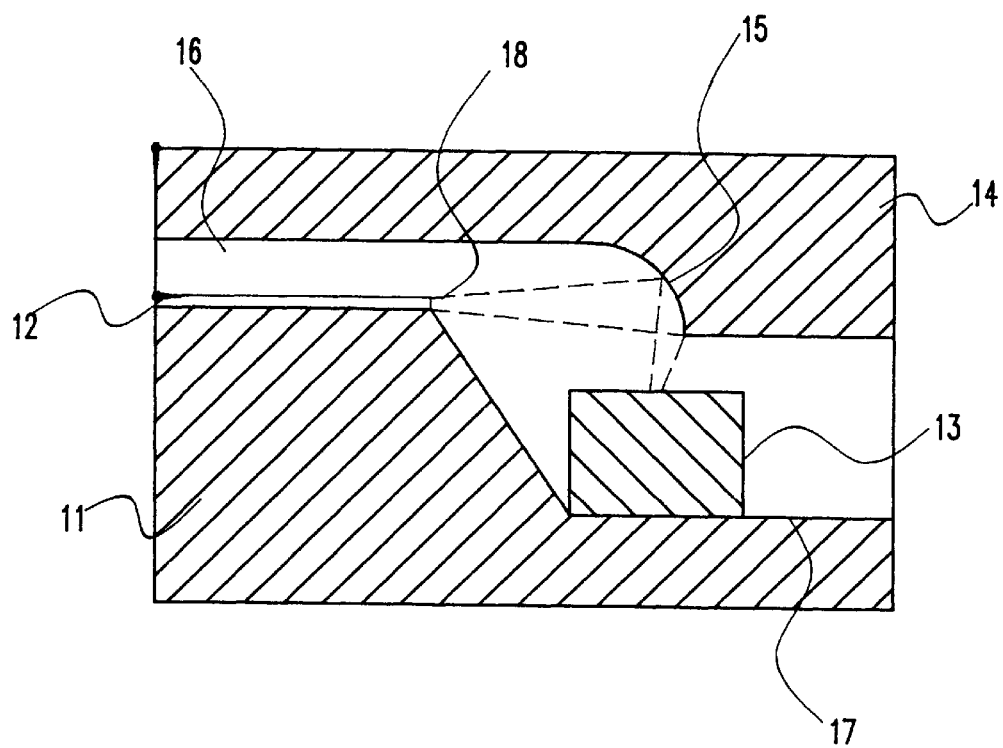
FIG. 3 shows a cross-sectional view of a light-receiving structure for waveguide type optical devices, which is a second preferred embodiment of the invention.

The light-receiving structure for waveguide type optical devices according to the invention illustrated in FIG. 3 features a concave reflector, which serves to reduce the reflection loss due to radiation. The shape of the concave reflector 15 can be so determined that the light emitted from an end face 18 of an optical waveguide 12 is reflected and condensed to a diameter either equal to or slightly smaller than the light-receiving diameter of a light-receiving element 13.

A reflector cannot be formed in a concave shaped by anisotropic optical etching of the silicon substrate as in the case of the first embodiment. However, if a cover 14 is made of mold resin, covers each having a reflector 15 in any desired concave shape can be mass-produced.

Still another preferred embodiment of the present invention will be described now with reference to FIGS. 4 and 5.

Figure 4:
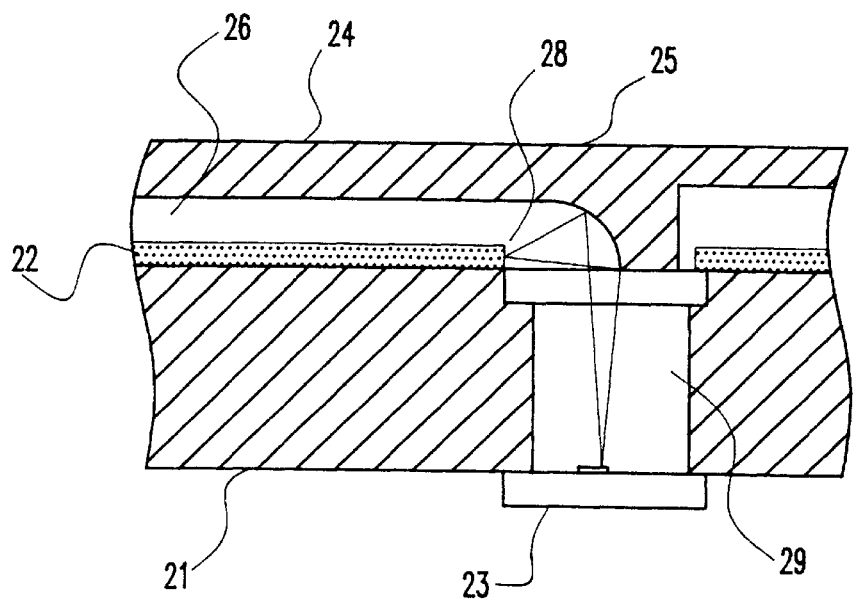
FIG. 4 shows a cross-sectional view of a light-receiving structure for waveguide type optical devices, which is a third preferred embodiment of the invention.
Figure 5:
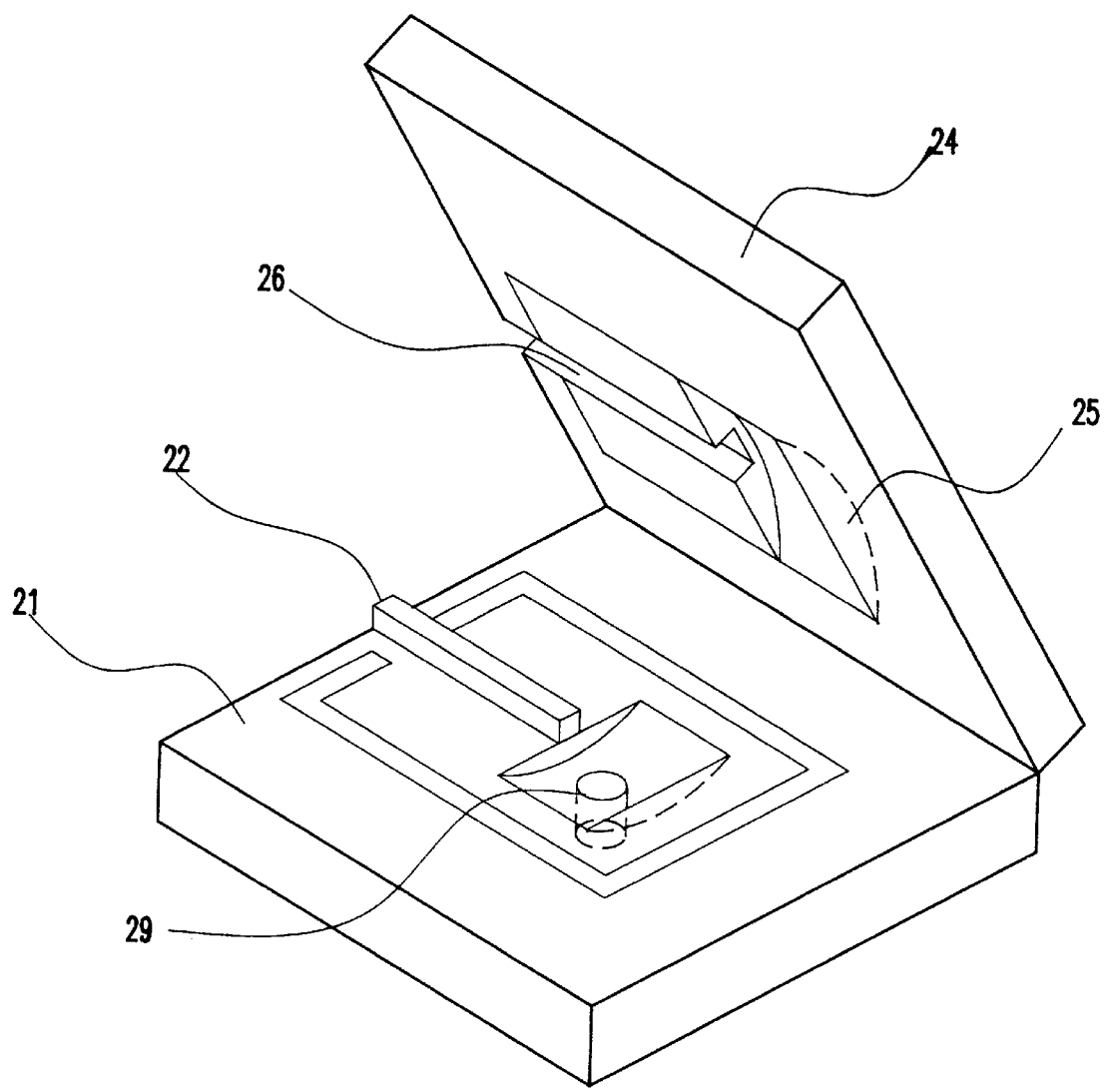
FIG. 5 shows a perspective view of the internal structure of the light-receiving structure for waveguide type optical devices, which is the third preferred embodiment of the invention.

FIG. 4 shows a cross-sectional view of a third preferred embodiment of the invention. Likewise, FIG. 5 shows a perspective view of the third embodiment of the invention. A silicon substrate 21 has a through hole 29, and a light-receiving element 23 is mounted with its light receiving face directed toward the through hole 29. A cover 24 provided with a concave reflector 25 is arranged over the silicon substrate 21 in a position opposite to the through hole 29. As in the second embodiment, a light reflected by the concave reflector 25 is condensed and coupled to the light-receiving element 23.

If the light-receiving element is mounted on the same face where an optical waveguide 22 is formed as in the first and second embodiments, there may be problems in that the effective area of the substrate surface is limited by the recess, and the electrode wiring to the light-receiving element should pass through the recess and, if any part of the electrode wiring crosses the optical waveguide, the process will become complicated. The limitations are particularly great in high-density integration. By contrast, the structure of the third embodiment, where the light-receiving element is mounted on the under face, is free from the aforementioned limitations.

In every embodiment, the coupling can be further strengthened by coating the reflector surface with a film of gold or some other substrate with a high reflection factor.

The first preferred embodiment will now be described in particular detail.

Referring back now to FIG. 2, on the face of the first silicon substrate 1 in the crystal face orientation (100) is formed a mask pattern of silicon dioxide by photolithography. Subsequent anisotropic chemical etching with, for instance, an aqueous solution of potassium hydroxide as etchant, results in the formation of a recess having an inclined side face in the crystal face orientation (111). Above this recess is formed the silicon dioxide based optical guide 2, cladded with silicon dioxide, doped with titanium dioxide and having silicon dioxide as a core. On the bottom of the recess is mounted the light receiving element 3 via an insulating layer of silicon dioxide formed, for instance, by thermal oxidation. A conductor pattern is provided on the silicon substrate 1 to achieve electric connection between the light-receiving element 3 and an external lead terminal.

In the second silicon substrate 4, also is formed a recess by anisotropic etching as in the first silicon substrate 1. A side face of the crystal face orientation (111), inclined by 54.74 degrees against the crystal face (100), is fixed above the first silicon substrate 1, with its top and bottom inverted, in a position opposite to the optical waveguide 2 on the first silicon substrate 1. On the inclined face of the second silicon substrate 4 is vapor-deposited a film of gold over a chromium undercoat to increase the reflection factor.

On the junction sides of the first and second silicon substrates 1 and 4 metallic film patterns are formed in advance for matching the positions of soldering bumps, and they are soldered together after these patterns are matched with each other.

This light receiving structure enables the signal light, having travelled the optical waveguide 2, and after being emitted from the end face 8, to be reflected by the inclined reflective face 5 of the second silicon substrate 4, and to arrive incident on the light-receiving face of the light-receiving element 3. The description of this specific embodiment applies to the second and third embodiments as well.

Figure 6:
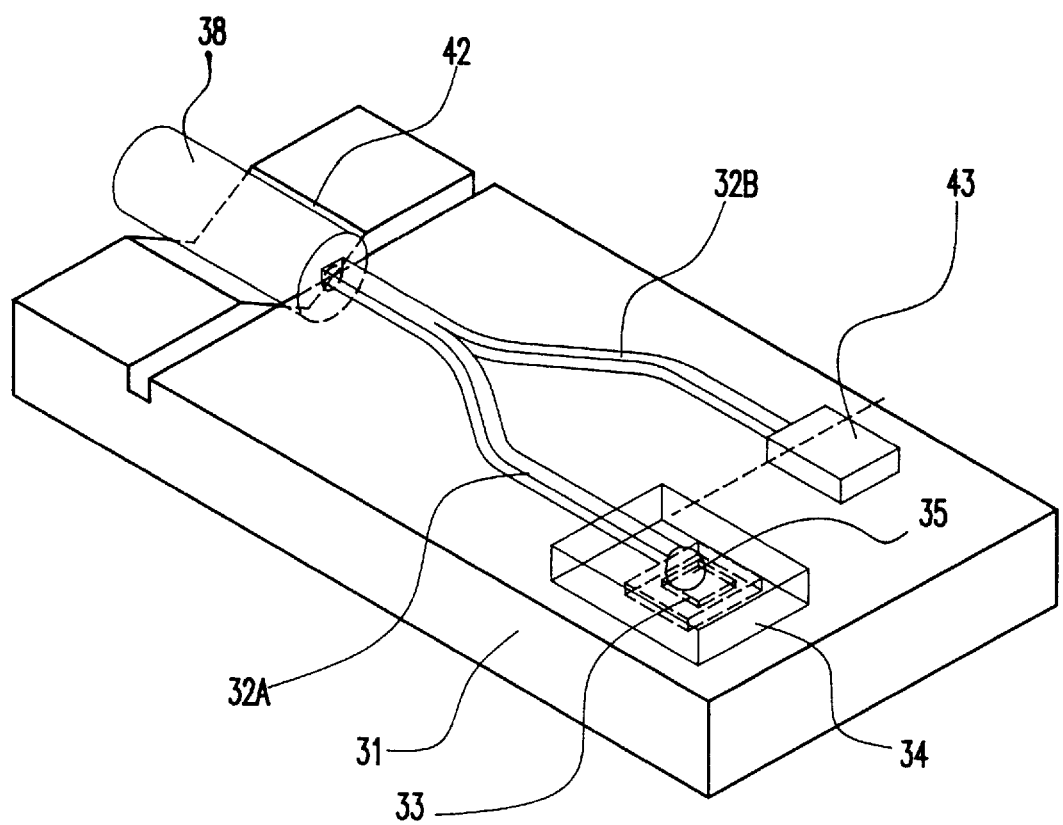
FIG. 6 illustrates an example of the application of a light-receiving structure for waveguide type optical devices to a bidirectional transmitter/receiver optical module.

Next will be described an embodiment in which a light-receiving structure for waveguide type optical devices according to the present invention is applied to an optical transmitter/receiver module for bidirectional optical transmission. FIG. 6 shows a perspective view of the transmitter/receiver optical module for bidirectional optical transmission, in which an optical waveguide 32 having a silicon dioxide core is formed on a silicon substrate 31. One end of the optical waveguide 32 is connected to an optical fiber 38, which is further connected to a transmission path optical fiber. In the silicon substrate 31 is formed in advance a V-groove 42, in which the optical fiber 38 is arranged. At this time, the core of the optical fiber 38 and the optical waveguide 32 become coincident in position and are optically coupled.

Midway on the optical waveguide 32 is formed a Y-branching part for two-way branching. The terminal end of one branched optical waveguide 32b is optically coupled to a semiconductor laser 43 arranged on the surface of the substrate 31. An optical signal emitted from the semiconductor laser 43 travels over the optical waveguide 32b, and is coupled to the optical fiber 38 to be sent out to the transmission path.

At the terminal end of the other branched optical waveguide 32a from the Y-branching of the optical waveguide 32 is arranged a reflector cover 34, which optically couples the light emitted from the optical waveguide 32a to the light-receiving element 33.

Figure 7:
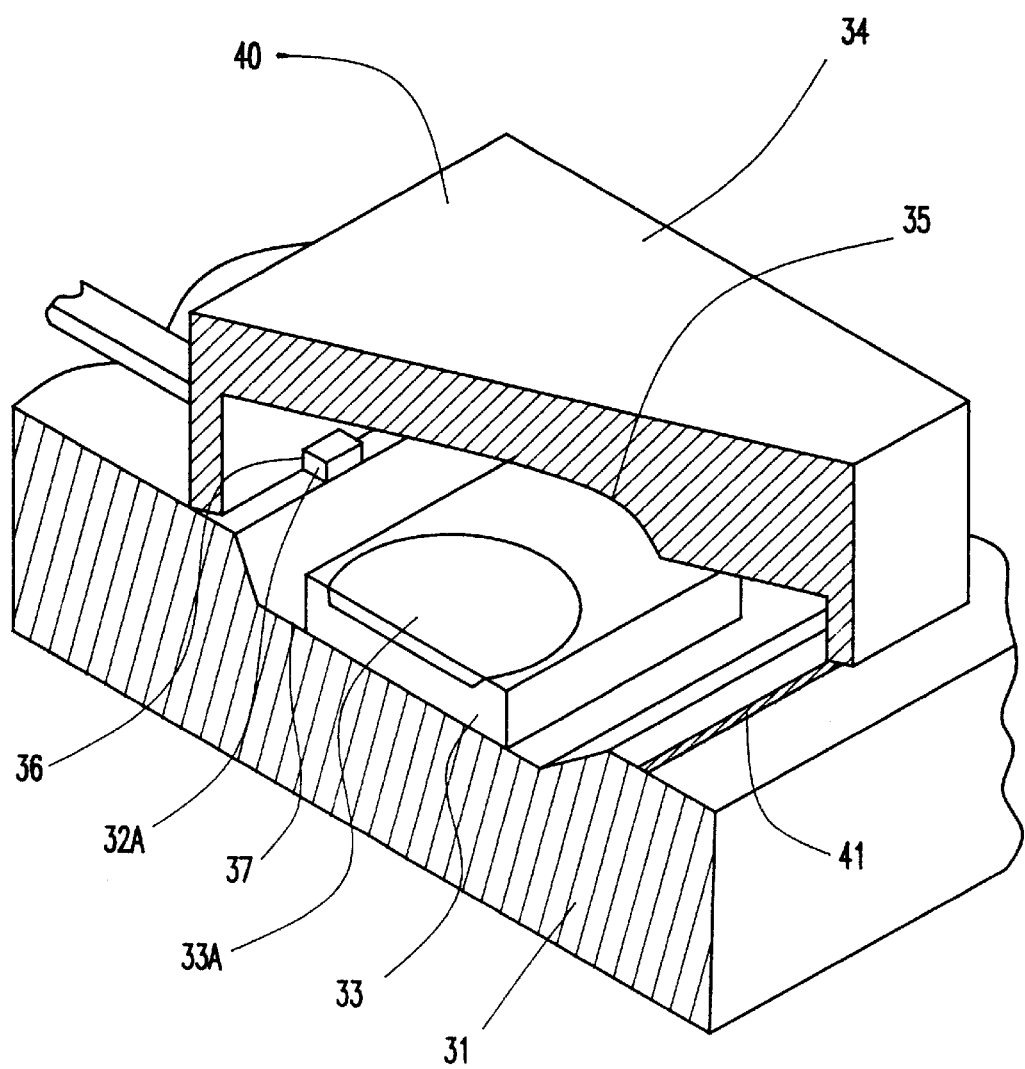
FIG. 7 shows an expanded view of the light-receiving structure for waveguide type optical devices according to the invention in the embodiment of FIG. 6.

Next, for ready understanding of the light-receiving structure for waveguide type optical devices according to the invention in this particular embodiment, the following description will refer to FIG. 7. FIG. 7 shows an expanded view of the light-receiving structure. The silicon substrate 31 is provided with a recess 37, formed in advance by chemical etching. On this recess 37 is mounted the light-receiving element 33 consisting of a germanium avalanche photodiode, with its light-receiving face 33a upward.

On the other hand, the reflector cover 34 is made of plastic and has a concave reflector 35 inside. This reflector cover 34 is formed by molding, and the surface of the concave reflector 35 is coated with films of chromium and gold to increase its reflection factor. The mounting face (not shown) of the reflector cover 34 is similarly coated. Furthermore, one side face of the reflector cover 34 is provided with a groove 36 to pass the optical waveguide 32a within.

The reflector cover 34 is arranged so as to substantially coincide with the metallic film part formed around the recess 37 on the substrate 31, and fixed with soldering bumps. The fixation with soldering bumps makes it possible to determine the relative positions of the optical waveguide 32, the reflector 35 and the light-receiving face 33a accurately. Wiring from the light-receiving element to any external circuit is accomplished by a metallic film pattern (not shown) provided on the substrate 31.

Next will be described, with reference to FIG. 8, a case in which the third preferred embodiment of the present invention is applied to the above-described optical transmitter/receiver module. The light-receiving structure illustrated in FIG. 8 differs from that shown in FIG. 7 in that the light-receiving element is arranged on the under side of the substrate 31, but is the same in all other respects.

The recess 37 has a through hole 39. In this embodiment, the through hole 39 is bored by irradiation with an excimer laser. To the under face of the substrate 31 is fastened the light-receiving element 33, with its light-receiving face toward the through hole 39. A received light emitted from the optical waveguide 32a is reflected by the concave reflector 35, passes the through hole 39 and irradiates the light-receiving face 33a. It should be noted that the concave reflector 35 condenses the emitted light even if the distance is long from the end face of the optical waveguide 32a to the light-receiving face 33a via the reflector 35, and therefore the light can be coupled to the light-receiving element 33 at high efficiency.

Figure 8:
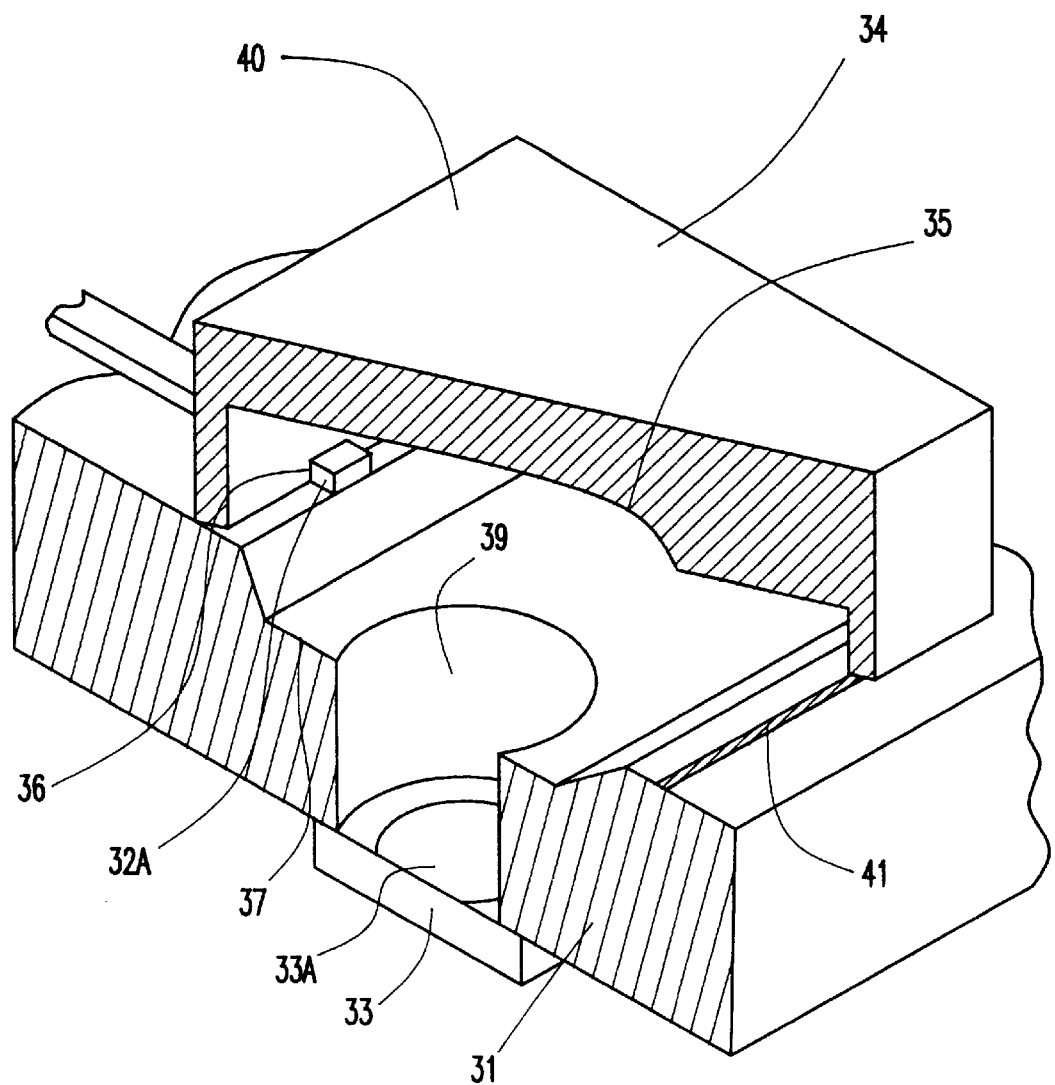
FIG. 8 shows an expanded view of the light-receiving structure of the third embodiment of the invention, used in place of the light-receiving structure for waveguide type optical devices according to the invention illustrated in FIG. 7.

In the waveguide type optical devices illustrated in FIGS. 7 and 8, since the semiconductor laser 43 and its drive circuit are arranged close to each other on the same substrate, the light-receiving element 33 is susceptible to electric noise from outside. In view of this, the external face of the reflector cover 34 is coated with a brass film 40, which readily reflects the noise which would otherwise reach the light-receiving element 33 and thereby facilitates high-quality reception.

To compare the light-receiving structures according to the invention illustrated in FIGS. 7 and 8, that shown in FIG. 7 is superior in that the packaged structure is simpler. However, in the structure shown in FIG. 8, the light-receiving element 33 is arranged on the under side of the substrate 31, and its light-receiving circuits and the like can also be arranged on the under face. Therefore, this structure is superior in that the effect of electric noise from the transmitting side, arranged on the substrate 31, can be more effectively avoided.

As hitherto described, the light-receiving structure for waveguide type optical waveguides according to the present invention enables the optical waveguide and the light-receiving element to be efficiently coupled to each other by forming a recess in part of the surface of the substrate on which the optical waveguide is formed, mounting the light-receiving element on the recess with its light-receiving face upward and arranging a cover, in which a reflector is formed, in a position opposite to the light-receiving element.

The cover in which the reflector is provided permits mass production by using a silicon substrate and applying anisotropic chemical etching. It is also possible to form the concave shape by fabricating the cover by molding resin. This helps to reduce the coupling loss, and also permits mass production of the cover.

Since the cover is mounted simply by being brought over and fixed to the substrate, it allows ready assembling. Furthermore, by boring a through hole in the substrate in advance and mounting the light-receiving element with its light-receiving face toward the through hole, it is made possible to mount the light-receiving element on the under face of the substrate for a greater packaging density.

Thus, the present invention makes it possible to realize a light-receiving structure for waveguide type optical devices, which excels in productivity, is compactly formed and permits highly efficient coupling.

What is claimed is:

1. A light receiving structure for waveguide type optical devices, comprising:
   a waveguide substrate having a top surface and having a recess lower than said top surface;
   an optical waveguide formed directly on said waveguide substrate, said optical waveguide having an end face proximate to said recess;
   a light-receiving element having a receiving face arranged within said recess proximate to said end face of said optical waveguide, said receiving face being lower than said top surface of said waveguide substrate; and
   a reflector, having a reflective surface above said top surface of said waveguide substrate and a reflective surface below said top surface, arranged near the end face of said optical waveguide on said waveguide substrate, for reflecting light emitted from said end face to a light-receiving face of said light receiving element.

2. A light-receiving structure for waveguide type optical devices, as claimed in claim 1, wherein said reflector is formed on a silicon substrate.

3. A light-receiving structure for waveguide type optical devices, as claimed in claim 2, wherein said reflector comprises an inclined face formed on said silicon substrate by chemical anisotropic etching.

4. A light-receiving structure for waveguide type optical devices, as claimed in claim 3, wherein a gold film is formed over said reflector.

5. A light-receiving structure for waveguide type optical devices, as claimed in claim 1, wherein said reflector is concavely shaped.

6. A light-receiving structure for waveguide type optical devices, as claimed in claim 5, wherein said reflector is formed of molded resin.

7. A light-receiving structure for waveguide type optical devices, as claimed in claim 6, wherein said reflector is coated with a film having a gold surface.

8. A light-receiving structure for waveguide type optical devices, as claimed in claim 1, wherein said waveguide substrate comprises silicon.

9. A light-receiving structure for waveguide type optical devices, as claimed in claim 8, wherein said recess is formed by silicon chemical anisotropic etching of said waveguide substrate.

10. A light-receiving structure for waveguide type optical devices, as claimed in claim 1, wherein said reflector is fastened by soldering.

11. A light-receiving structure for waveguide type optical devices, as claimed in claim 1, further comprising a cover positioned over an upper face of said waveguide substrate, wherein said reflector is formed on a concavely shaped part of a cover and an external face of said cover is coated with a metallic film.

12. A light-receiving structure for waveguide type optical devices, as claimed in claim 11, wherein said metallic film is made of brass.

13. A light-receiving structure for waveguide type optical devices, as claimed in claim 11, wherein a semiconductor laser is arranged on said substrate.

* * * * *